United States Patent [19]

Ashikian

[11] 3,752,395
[45] Aug. 14, 1973

[54] WIND MOTOR OPERATED HEATING SYSTEM

[76] Inventor: Baruir Ashikian, 505 Frechette, Sherbrooke, Quebec, Canada

[22] Filed: June 28, 1971

[21] Appl. No.: 157,428

[52] U.S. Cl. .................... 237/46, 60/26.2, 122/26
[51] Int. Cl. ..................... F24d 5/02, F24d 12/00
[58] Field of Search ................ 237/46; 60/26.2; 122/26

[56] References Cited
UNITED STATES PATENTS
2,107,933   2/1938   Crockett et al. ................ 122/26

FOREIGN PATENTS OR APPLICATIONS
169,358   8/1920   Great Britain .................... 122/26

*Primary Examiner*—William E. Wayner

[57] ABSTRACT

A wind motor supplies mechanical energy to operate a mechanohydrothermal energy conversion system, the resulting heat being stored in a liquid and used as needed.

1 Claim, 2 Drawing Figures

Patented Aug. 14, 1973

3,752,395

INVENTOR
BARUIR ASHIKIAN

WIND MOTOR OPERATED HEATING SYSTEM

This invention relates to systems for heating the interior of enclosures intended for any use.

Present heating systems rely mainly on the combustion of petroleum products, but in view of the pressing need to reduce air pollution and delay depletion of petroleum resources, alternate heating sources will draw an ever increasing attention. Moreover, relatively low cost heating is unavailable in places which need it most: the sparsely habitated, very cold regions of the American continent. In such regions, the heat required for any human activity is obtained, almost exclusively, by burning oil transported at very high cost.

My invention is intended to provide an alternate heating method by making use of the almost unlimited wind energy available almost everywhere on the earth's surface and could have an immediate use in the northern regions of North America where significant savings are possible by switching to heating based on free wind energy which has the added advantage of being free of pollution.

Winds have variable intensities and the data gathered in the far North reveals periods of calm stretching for 2 or 3 days; this means that wind operated heating systems must provide adequate storage for the incoming heat which varies with the cube of wind's speed.

In my invention, the wind's kinetic energy is transformed, by a suitable wind motor, into mechanical energy which is degenerated into heat within a mechanohydrothermal energy converter. The resulting heat is transferred to a liquid contained within the thermally insulated enclosure under consideration. In many applications, another fluid distributes part of this heat throughout the desired space of the enclosure and any excess of heat is stored in the liquid and is used during windless periods.

Further features of my invention will become apparent from the following description and the appended claim with reference to the accompanying drawings in which:

Figure 2:
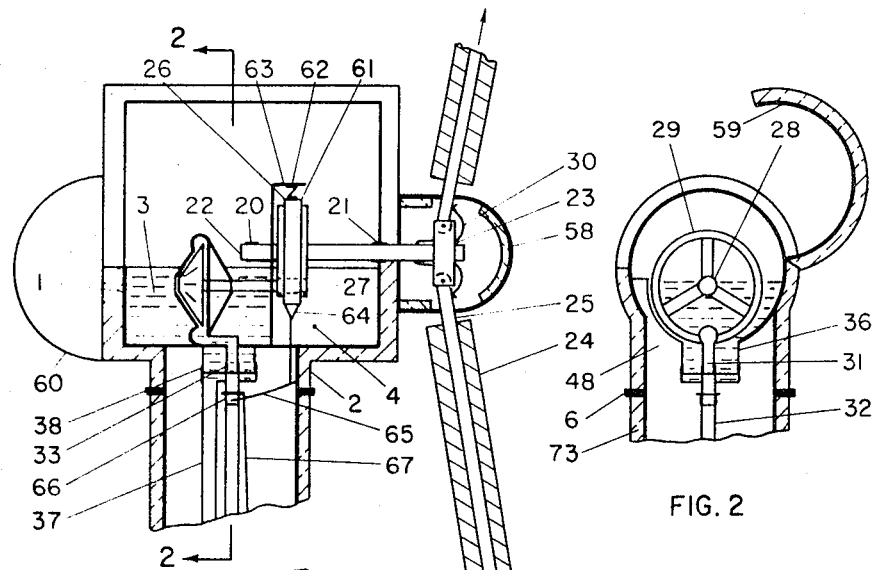
FIG. 2 is a diagrammatic transverse sectional view on the line 2—2 of FIG. 1.
Figure 1:
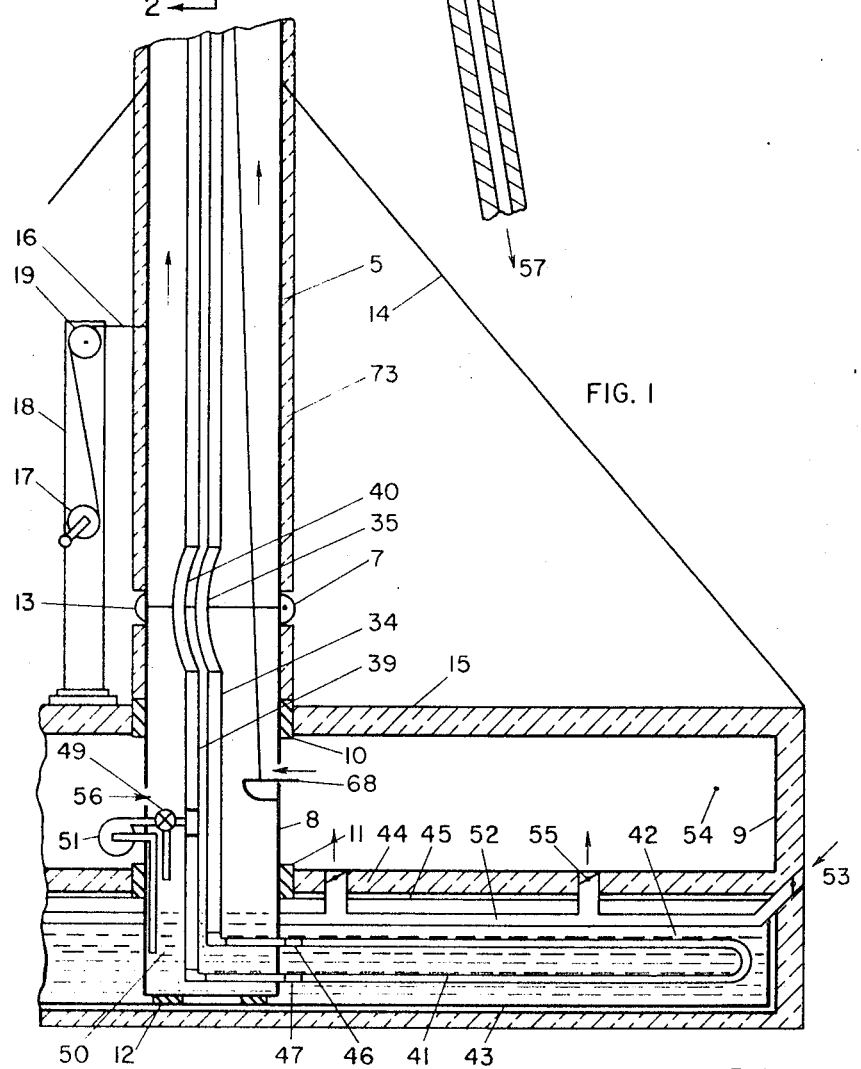
FIG. 1 is a diagrammatic sectional view of a heating system using a wind turbine operated mechanohydrothermal energy converter and of the associated enclosure.

Omitted from these drawings and the following description are many construction details which, although very important for satisfactory service, are quite irrelevant in the context of this disclosure and of the appended claim. Also the diagrammatic sectional views are not to scale, their only purpose being that of showing the functional relationships existing between the various major components and that of identifying them.

In these drawings, 1 denotes a semi-cylindrical housing having a short cylindrical base 2 perpendicular to it. The housing 1 is divided in a front compartment 3 and a rear compartment 4. This entire assembly is mounted on top of a cylindrical hollow column 5 and can rotate around it thanks to a thrust bearing 6 located between this column and the housing base 2. The column 5 is attached at its lower end, via a hinge 7, to a lower cylindrical hollow column 8 secured to the structure of the heat requiring enclosure 9, via suitable vibration absorbing devices 10, 11 and 12. This lower column 8 is closed at its lower end, thereby providing a suitable storage volume. The column 5 is held upright by suitable latches 13 located near the hinge 7, by several cables 14 attached to the enclosure roof 15 and by a cable 16 pulled with a winch 17 mounted on an auxiliary column 18 of a suitable cross section and rigidly secured to the enclosure roof 15. The cable 16 is guided by a pulley 19 mounted on the auxiliary column 18.

When the housing 1 has to be lowered for servicing, the latches 13 and the appropriate cable 14 are released and the cable 16 is unreeled until the column 5, swinging around the hinge 7, comes to rest on the roof. For erection, the column 5 is lifted until its angle enables the use of the winch.

The rear end wall and the midpartition wall of the housing compartments 4 and 3 support pillow blocks 20 and 21 in which rotates a hollow shaft 22 carrying at its rear end a hub 23 to which are hinged two or more wind turbine blades 24 equipped with hollow main spars 25. When the wind blows from a given direction, the housing 1 turns parallel to the wind and places the turbine down wind. The shaft 22 turns an internal spur gear 26 engaging a pinion 27 mounted on the shaft 28 of a centrifugal pump 29 located within the front compartment 3. As the wind turbine turns, it entrains the pump's impeller at a higher speed and the power developped by the turbine is absorbed by the pump. Suitable springs 30 keep the conning angle of the wind turbine blades at their maximum value as long as the wind speeds remain below a certain value imposed by the designer.

Above this speed, the wind pressure exerted on the turbine blades overcomes the spring and centrifugal forces, reduces the blade's conning angle and limits the turbine's rotational speed to an acceptable maximum value.

The centrifugal pump 29 is installed in a loop consisting of a discharge branch, of a hydrothermal energy converter, of a return branch and of a tank surrounding the pump. The liquid circulating within the loop has antifreeze properties and good thermal stability.

The discharge branch consists of an upper pipe 31 connected to the outlet of pump 29 and centrally located within the housing base 2, of a middle pipe 32 centrally located within the upper column 5 and joined to pipe 31 via a high pressure rotary seal 33, and of a lower pipe 34 centrally located within the lower column 8 and joined to pipe 32 via a flexible tube 35.

The return branch consists of an upper pipe 36 connected to the compartment 3 which contains antifreeze liquid to be drawn by the pump, of a middle return pipe 37 located alongside pipe 32 and connected to pipe 36 via a low pressure rotary seal 38, concentric to and surrounding the high pressure rotary seal 33, and of a lower pipe 39 located alongside pipe 34 and connected to pipe 37 via a flexible tube 40.

The flexible tubes 35 and 40 allow column swinging without disconnecting any pipe. The rotary seals 33 and 38 are required because the housing 1, containing the pump 29 and the upper pipes 31 and 36, turns around the stationary column 5 containing the middle pipes 32 and 37.

The hydrothermal energy converter consists of a suitably coiled, long pipe 41, having a small diameter which imposes high flowing speeds upon the antifreeze liquid circulating within, such high speeds causing high shear stresses and hence rapid dissipation of fluid energy into heat. This coil 41 is immersed in a large quantity of heat storing liquid 42 contained within a suitable tank 43 located below the thermally insulated inside floor 44 of the enclosure 9. The inner walls 45 of the compartment containing the tank 43 are provided with a suitable vapor barrier. The long pipe 41 is connected, via flexible tubes 46 and 47, to the respective lower ends of pipes 34 and 39.

The heat generated within the hydrothermal energy converter 41 is transferred to the heat storing liquid 42 which is most likely ordinary water. The centrifugal pump 29 driven by the wind turbine draws antifreeze liquid from the compartment 3 and produces sufficient pressure to overcome the restriction to flow encountered in the discharge pipes, in the hydrothermal energy converter which accounts for a major portion of the resistance and in the return pipes.

Antifreeze liquid which might leak at the rotary seals 33 and 38, or which is discharged through an overflow pipe 48 located between the compartment 3 and the housing base 2, or which is drained through a valve 49 connected to the return pipe 39, falls into the reservoir 50 located at the lower end of column 8 and can be returned to circulation with the use of a pump 51 which can draw antifreeze liquid from the reservoir 50 and send it into the return pipe 39. Draining the upper portions of the system is required when the wind turbine has to be lowered for servicing.

The tank 43 contains a number of air heating ducts 52, immersed in the heat storing liquid and receiving cold outside air through several controllable inlet ports 53 located in the walls of enclosure 9. The heated air is discharged into the upper compartment 54 of the enclosure 9 via controllable openings 55 located in the inside floor 44. The viciated air of the upper compartment 54 is exhausted through controllable openings 56 in the lower column wall and passes through the columns 8 and 5, the housing base 2, the overflow pipe 48, the hollow turbine shaft 22, the blade hollow spars 25 and escapes finally through openings 57 located at the blade tips. Heat losses are minimized by very well insulated walls, roof and outer floor, and by a minimum number of doors and windows.

Appreciable rates of air flow are possible thanks to the draft caused by the height and thanks to the centrifugal action of the rotating blades. This flow of warm air keeps the interior of housing 1, of the spinner 58 surrounding the turbine hub 23, and of the columns 5 and 8, at reasonable temperatures and its effect is enhanced with a layer 73 of thermal insulation covering the exterior surfaces of the aforementioned elements and of a semi-circular cover 59 hinged and latched to the housing 1. A suitable shaped dome 60, filled with a thermal insulator, is secured to the housing 1, and its role is that of minimizing heat losses from the antifreeze liquid of compartment 3 and of providing a smooth air flow around the housing. The cover 59 allows an easy access to the components contained within the housing.

During windless periods, the airflow through the heating ducts 52 is induced by the draft alone and therefore is smaller than that obtained during windy periods. The quantity of heat storing liquid is determined by the maximum heat losses which have to be made for during the longest windless period and by the minimum admissible temperature within the upper compartment 54. A small, oil heating stove could be provided for emergency use.

The wind turbine is stopped by operating a brake system consisting of an elastic band 61 covered with a lining and kept away from the internal spur gear 26 acting as a brake drum, by suitable springs 62 attached to an appropriate support 63, of an upper cable 64 attached to an upper lever 65 hinged with one end to the inner wall of housing base 2 and resting with its second forklike end under a collar 66 mounted around pipe 32 and capable of sliding around it, of a lower cable 67 attached to the collar 66 and to a lower lever 68 hinged to the lower column 8 and extending into the upper compartment 54. The turbine stops when the lever 68 is pulled down against the springs 62 and resumes its rotation when the lever 68 is released.

Another alternative is offered by a design featuring a centrifugal pump located at the bottom of the lower column 8 and driven by the wind turbine via a mechanical power transmission system located within the housing 1. Means have to be provided to counteract the torque transmitted to the housing whenever the turbine is of the self orienting type. The use of a servo-positioner is advisable for large turbines, in which case the counteracting torque device is not required.

The choice of a wind motor and of its controls, considerations concerning the end use of the heated enclosure, its size, its construction, introduction of auxiliary functions such as electricity generation, of a hot water consumption system, of more sophisticated heat controls and so on, do not affect in any way the appended claim.

What is claimed is:

1. In a heating system consisting of a wind motor, of a pump driven by this motor, of a long pipe of small diameter suitably coiled and connected to the pump inlet and outlet, of a fluid circulating through the pump and pipe circuit, said coiled long pipe acting as a hydrothermal energy converter, of a fluid surrounding said coiled pipe and acting as a receiving and storing medium for the heat generated in the said coiled pipe; a heat storing liquid contained in a tank located in the lower compartment of a thermally insulated enclosure, a hydrothermal energy converter immersed in said liquid, a centrifugal pump located within a thermally insulated housing mounted on top of a tall column erected above said enclosure and hinged to a lower column passing through the roof of said enclosure and extending its closed lower end into the lower compartment of said enclosure, said centrifugal pump being driven, via suitable gears, by a wind motor having a hollow shaft supported by said housing and provided with means to follow the wind's direction and means to limit its power output, a tank surrounding said pump and containing antifreeze liquid, an overflow pipe in said tank, discharging into said tall column, high pressure piping connecting the discharge port of said pump to the inlet of said hydrothermal energy converter, said piping consisting of an upper pipe attached to said pump and moving with said housing, of a middle pipe, located within said tall column and communicating with said upper pipe via a high pressure rotary seal centrally located at the base of said housing and of a lower pipe located within said lower column and connected to said middle pipe via flexible tubing located at the base of said tall column and connected, at its other end, to said hydrothermal energy converter, low pressure piping connecting said tank surrounding the pump to the outlet of said energy converter, said piping consisting of an upper part moving with said housing, of a middle pipe located within said column and communicating with said upper part via a low pressure rotary seal concentric to and surrounding said high pressure rotary seal and of a lower pipe located within said lower column and connected to said middle pipe via flexible tubing located at the base of said tall column and connected at its other end to said hydrothermal energy converter and to a filler and drain pipe, a drain valve and a pump connected respectively to said drain and filler pipe, antifreeze liquid contained at the closed end of said lower column, air heating pipes immersed in said heat storing fluid, said pipes admitting cold outside air and delivering it heated into the upper compartment of said enclosure, the flow of air being naturally or forcefully created and controlled with suitable means, an air exhaust path for the viciated air of said enclosure's upper compartment, said path consisting of opening in the wall of said lower column, of the bore of both said columns, of opening in the base of said housing, of the inside of said housing, of openings in the wind turbine's hollow shaft, of the bore of said shaft, of the spar bore in each turbine blade and finally of an exhaust opening at each blade tip, an auxiliary shorter column erected above said enclosure and equipped with a winch whose cable, guided by a pulley, located at the top of said auxiliary column, is attached to said tall column, and mountings between said lower column and said enclosure, said mounting absorbing the vibrations induced by said wind motor.

* * * * *